March 11, 1941. H. E. CARLSON Re. 21,742

AUTOMATIC TOBACCO FEED FOR CIGAR MACHINES

Original Filed Oct. 4, 1934 4 Sheets-Sheet 1

INVENTOR
Hjalmar E. Carlson
BY
Sydney B. Prescott
ATTORNEY

March 11, 1941. H. E. CARLSON Re. 21,742

AUTOMATIC TOBACCO FEED FOR CIGAR MACHINES

Original Filed Oct. 4, 1934 4 Sheets-Sheet 2

INVENTOR
Hjalmar E. Carlson
BY
Sydney P. Prescott
ATTORNEY

March 11, 1941. H. E. CARLSON Re. 21,742
AUTOMATIC TOBACCO FEED FOR CIGAR MACHINES
Original Filed Oct. 4, 1934 4 Sheets-Sheet 3
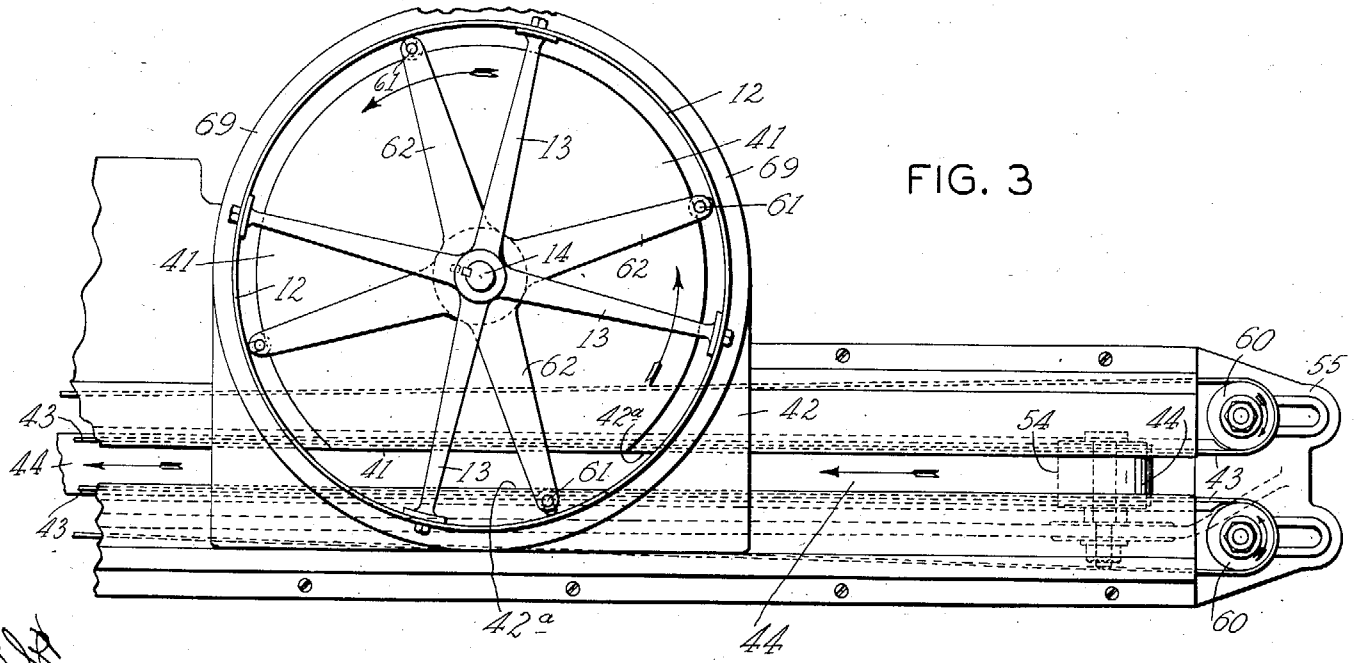
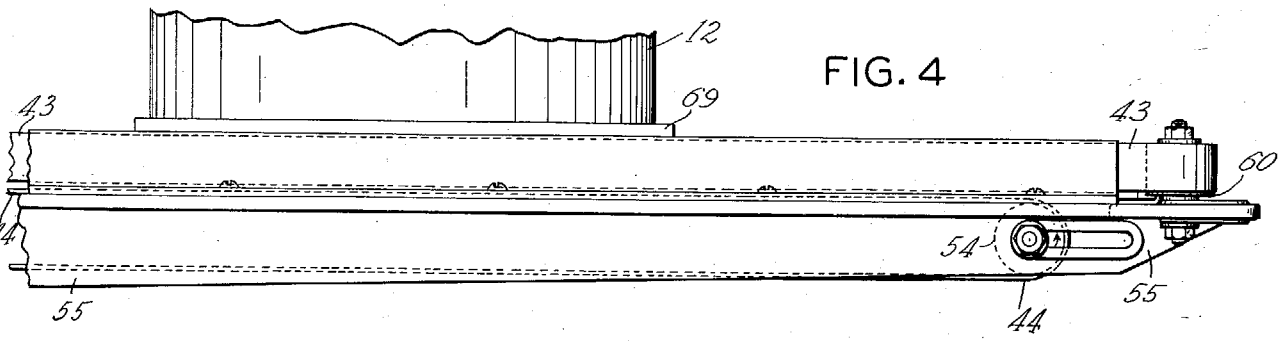
INVENTOR
Hjalmar E. Carlson
BY
Sydney B. Prescott
ATTORNEY AUTOMATIC TOBACCO FEED FOR CIGAR MACHINES
Original Filed Oct. 4, 1934 4 Sheets-Sheet 4
FIG. 5
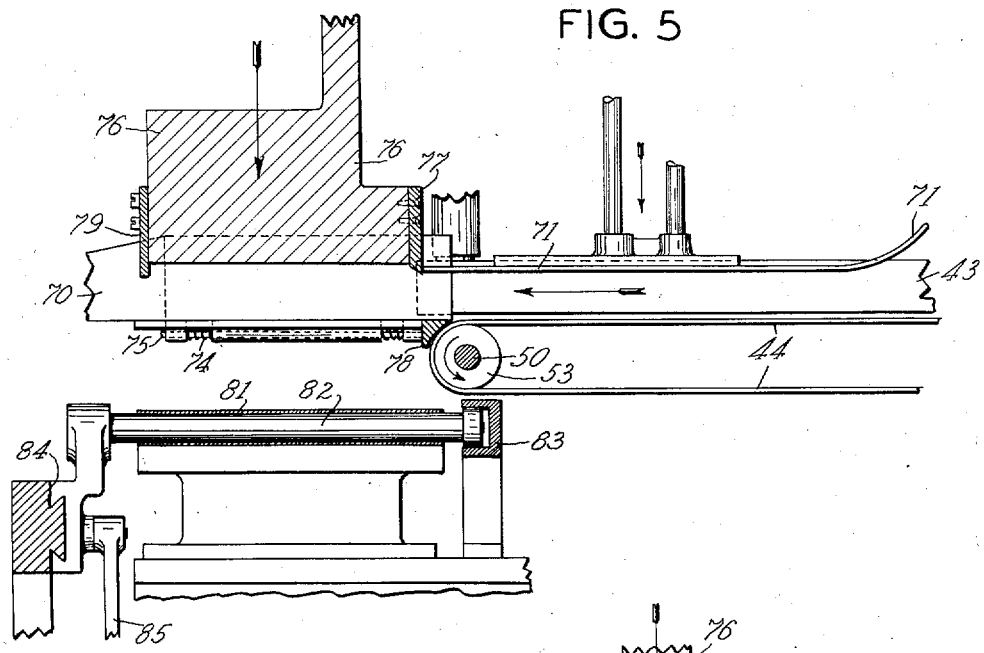
FIG. 6
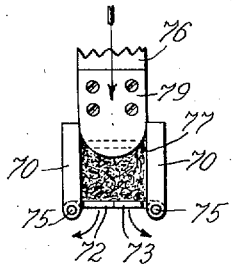
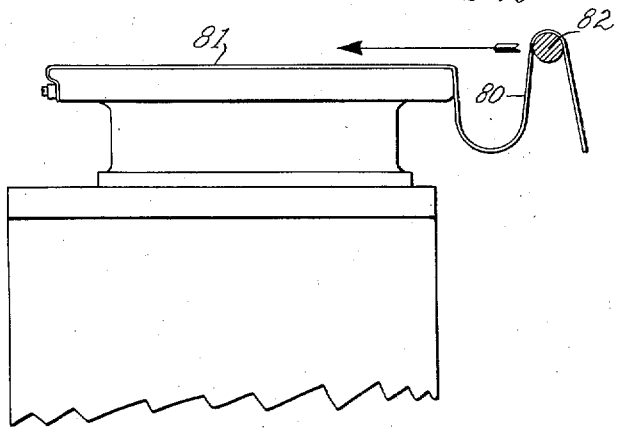
INVENTOR
Hjalmar E. Carlson
BY
Sydney J. Prescott
ATTORNEY Reissued Mar. 11, 1941

Re. 21,742

UNITED STATES PATENT OFFICE 21,742

AUTOMATIC TOBACCO FEED FOR CIGAR MACHINES

Hjalmar Erik Carlson, Brooklyn, N. Y., assignor to International Cigar Machinery Company, a corporation of New Jersey Original No. 2,016,167, dated October 1, 1935, Serial No. 746,888, October 4, 1934. Application for reissue July 28, 1937, Serial No. 156,240

17 Claims. (Cl. 131—42)

This invention relates to tobacco feeds for cigar machines, especially those machines wherein the filler for the cigar bunches is fed automatically.

The main object of this invention is to automatically feed large, medium, or short scrap tobacco in a continuous stream and level the stream during the feeding operation.

This object is achieved by means of a vertical intermittently rotating hopper placed over a filler feeding channel formed by a number of feed belts traveling in synchronism but in the opposite direction to said hopper. The latter is equipped with a stationary bottom provided with a slot overlying the channel and rotating agitators, and the bottom edge of said hopper is provided with serrations which during the feeding operation serve to arrange the scraps lengthwise of the channel and level the stream of tobacco in the channel in a most effective manner.

This improved tobacco feed may be used in connection with the Tobacco butt making machine disclosed in the co-pending application of Sigurd Clausen, S. N. 742,179, filed Aug. 30, 1934.

With this and other objects not specifically mentioned in view, the invention consists in certain constructions and combinations hereinafter fully described and then specifically set forth in the claims hereunto appended.

In the accompanying drawings which form a part of this specification and in which like characters of reference indicate the same or like parts:

Fig. 3 is a plan view of tobacco feed mechanism;

Fig. 4 is a front elevation of the same;

Fig. 5 is a sectional view in side elevation of the filler transfer and rolling apron;

Fig. 6 is a detail end elevation partly in section of certain parts shown in Fig. 5.

In carrying the invention into effect there is provided a plurality of traveling belts arranged to form a filler feeding channel, and a tobacco hopper rotating about a vertical axis and having a stationary bottom provided with a slot overlying the channel, whereby a continuous stream of tobacco is placed in the channel. In the best constructions contemplated, the hopper is provided with rotary agitators, and there is also provided means for intermittently driving the belts, hopper and agitators in synchronism. These various means and parts may be widely varied in construction within the scope of the claims for the particular device selected to illustrate the invention is but one of many possible concrete embodiments of the same.

The automatic tobacco feed hereinafter described is operated from the main drive of the cigar machine by means of a worm gear drive enclosed in housing 10 (Fig. 1); a shaft 11 constantly driven by said worm gear drive projecting out of housing 10 and serving as the main drive shaft for the tobacco feed.

Figure 1:
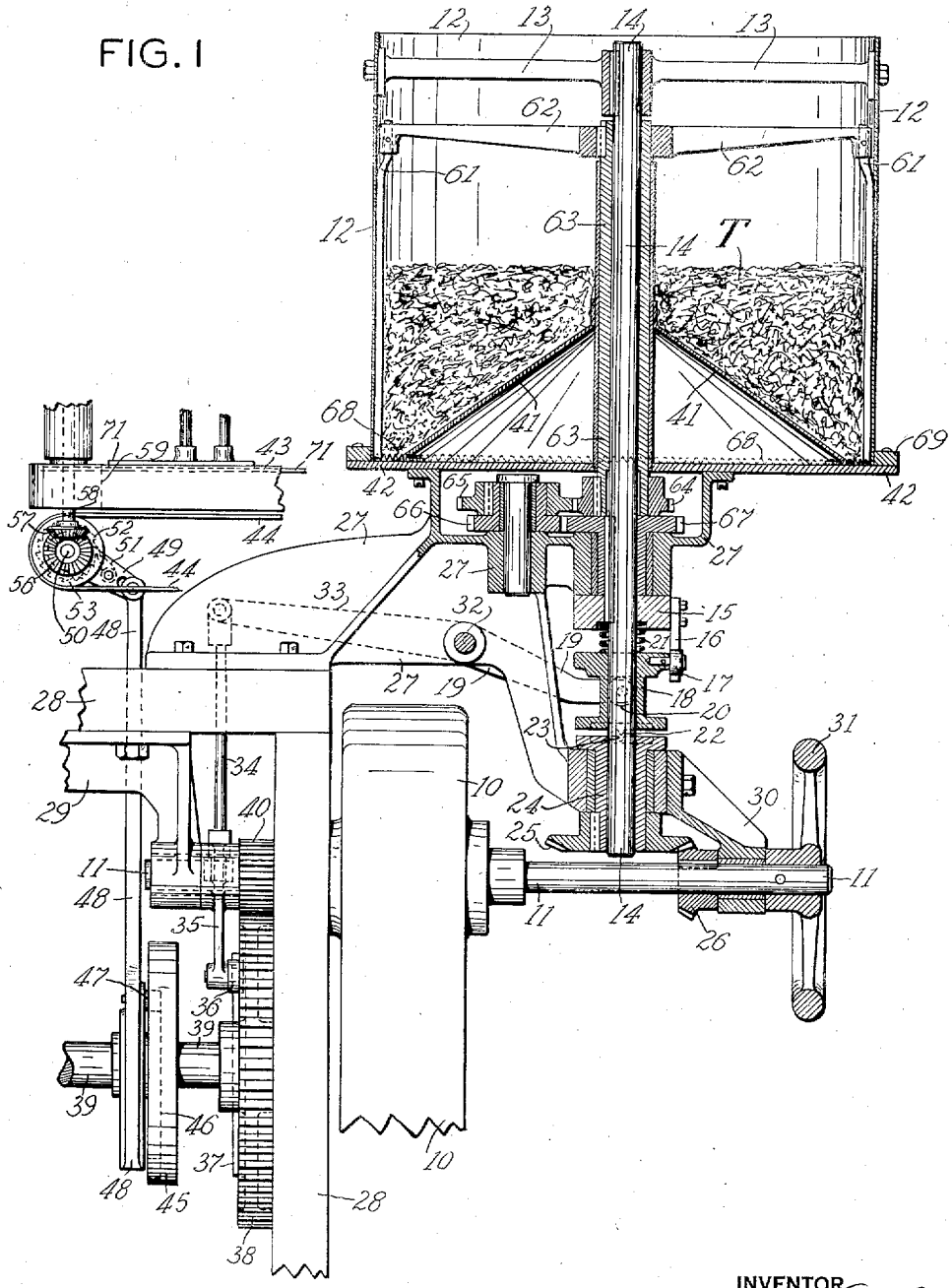
Fig. 1 is a sectional front elevation of the automatic tobacco feed.

The scrap tobacco T is deposited in an intermittently rotating vertical hopper 12 supported and driven by means of arms 13 on a central hub attached to a vertical shaft 14. To the latter is splined a driving flange 15 equipped with a bar 16 bearing against a roller 17 pivoted to a clutch sleeve 18 slidably mounted on shaft 14. Clutch sleeve 18 is controlled by means of a pair of arms 19 carrying a pair of rollers 20 engaging with the upper flange of clutch sleeve 18. Between the latter and flange 15 a tension spring 21 is interposed for the purpose of pressing the teeth 22 on the lower end of clutch sleeve 18 into engagement with the notches 23 of another clutch sleeve 24 when arms 19 and rollers 20 release clutch sleeve 18. To the hub of clutch sleeve 24, which is loosely mounted on shaft 14 is keyed a bevel gear 25 meshing with a bevel gear 26 mounted on shaft 11. Shaft 14 and clutch sleeve 24 are supported by means of a bearing bracket 27 fastened to the main frame 28 of the cigar machine. Shaft 11 is supported in bearings of main frame 28, bracket 29 and bracket 30 (Fig. 1). The latter is attached to bearing bracket 27 and the bracket 29 is fastened to main frame 28. For the convenience of the attendent, shaft 11 also carries a hand wheel 31.

Figure 2:
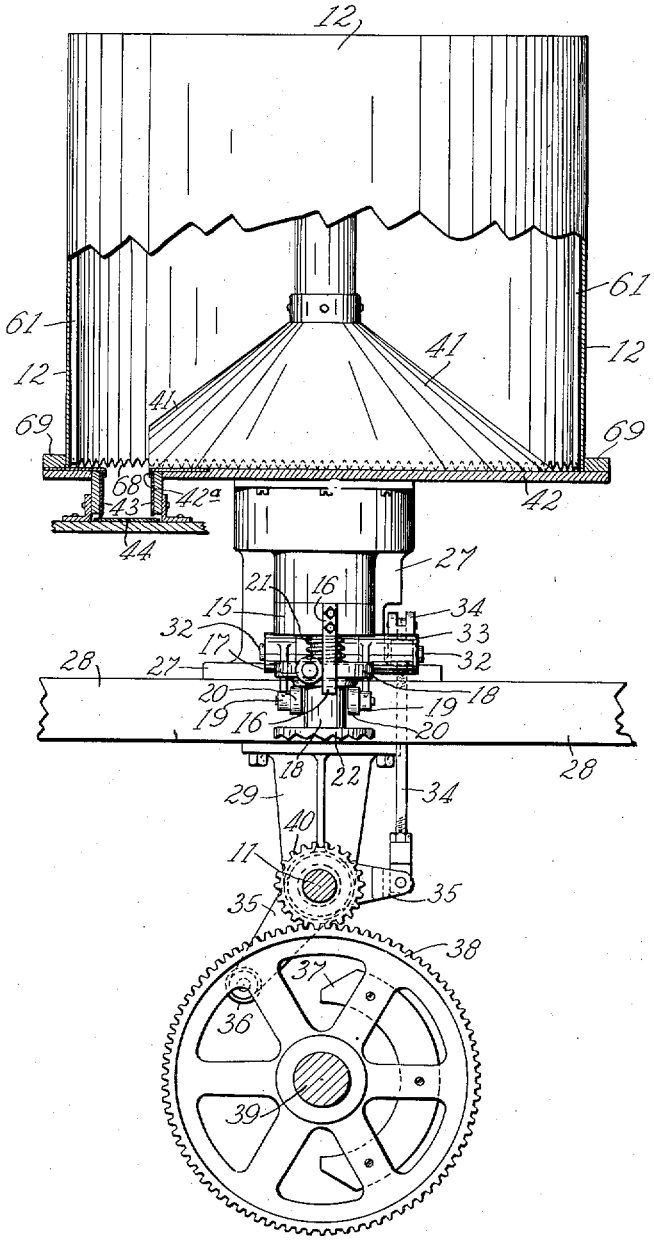
Fig. 2 is a sectional end elevation of the same.

Arms 19 are mounted on a shaft 32 supported in bearings of bracket 27. Shaft 32 is actuated by means of an arm 33 which through rod 34 is connected to a bell crank lever 35, one arm of lever 35 carrying a cam roller 36. Bell crank lever 35 is loosely mounted on shaft 11 and is operated by means of a cam piece 37 attached to a gear 38 mounted on shaft 39 to intermittently disengage the clutch members 18 and 22. Gear 38 is driven by means of a gear 40 fastened to shaft 11. The bottom of the hopper 12 consists of a stationary cone 41 mounted on a bottom plate 42 provided with a slot 42a overlying a filler feeding channel (Fig. 2) formed by two side guide belts 43 and a bottom guide belt 44 (Figs. 2, 3, and 4). One side of the cone 41 is flattened along a vertical plane coinciding with one side of the slot 42a to permit the mass of tobacco in the hopper to be swept over the slot. The belts 43 and 44 travel intermittently and in synchronism with hopper 12, but in a direction opposite to the same, whereby the serrated lower edges of the hopper serve to level the stream of tobacco in the channel and prevent choking of the same.

For the purpose of illustrating a proper time relation between the hopper driving mechanism and the feed belt drive, one possible form of the latter is shown in Fig. 1; although it will be understood that the feed belt drive may have other forms. In the feed belt drive shown herein a cam 45 (Fig. 1) is attached to shaft 39. A cam roller 47 engaging in a cam track 46 of cam 45 is carried on sliding rod 48 connected to an arm 49 loosely mounted on shaft 50 so that the arm 49 is periodically oscillated. To lever 49 is pivoted a spring pawl 51 engaging a ratchet 52 fixed on shaft 50, the latter carrying a pulley 53 driving the bottom guide belt 44 which is trained at its other end over an idler pulley 54 (Fig. 4) adjustably supported on feed brackets 55. Shaft 50 also carries a pair of bevel gears 56 (Fig. 1) meshing with a pair of bevel gears 57 mounted on shafts 58 which carry pulleys 59 driving the side guide belts 43 which are also led over idler pulleys 60 (Figs. 3 and 4) adjustably pivoted to bracket 55 While the just described feed belt drive is merely a schematic illustration to illustrate proper time relation, a more practical drive and control mechanism of feed belts 43 and 44 is shown in the co-pending application referred to above, shaft 39 herein corresponding to shaft 51 of the feed belt drive shown in said application and belts 43 corresponding with belts 24 and 25 thereof, and belt 44 corresponding with belt 23 therein.

In order to prevent the scrap tobacco T from sticking to the inside wall of the hopper 12, a number of vertical rotary agitators 61 are provided to contact said inner wall and rotate intermittently in the same direction as the latter but at a different speed, thereby keeping the scrap tobacco T in the hopper 12 always moving so it can freely enter the filter feeding channel through the slot 42*a*.

Agitators 61 are fastened to arms 62 of a central hub keyed to a vertical sleeve shaft 63 (Fig. 1) loose on the vertical shaft 14. To the lower end of sleeve shaft 63 is fastened a gear 64 meshing with a gear 65 fast on the hub of a gear 66 pivoted to bracket 21, and driven by a gear 67 splined to vertical shaft 14.

The bottom edge of the hopper 12 is provided with serrations 68 for the purpose of giving the tobacco scraps a longitudinal direction while being fed into the U shaped feed channel. The serrations 68 during the rotation of hopper 12 also effect a separation of the tobacco in the hopper from that advancing in the channel, thus leveling the tobacco in the channel without disturbing the stream of tobacco.

A guide ring 69 mounted on bottom plate 42 and surrounding the bottom edge of the hopper 12 prevents the escape of any tobacco on its way to the feed channel.

In connection with the tobacco feed channel and hopper above described, means are provided for separating a bunch length from the forward end of the stream conveyed by the channel and its associated belts and in addition mechanism is provided for displacing this bunch length directly into the loop of a rolling apron or chianti belt for forming a bunch.

This severing and displacing means includes a presser foot 71 which compresses the tobacco at the forward end of the channel against the belt 44 to render it sufficiently self sustaining to be capable of being pushed out over gates 72 and 73 between confining walls 70, which gates are normally spring pressed to horizontal position by springs 74 surrounding their pintels 75. The presser foot is reciprocated in timed relation to the movement of the belts 43 and 44 so as to press during the dwell of the belts, by means fully shown in the application of Clausen, above identified.

A plunger 76 moves vertically downward toward the gates 72 and 73 carrying with it a cutter or severing knife 77 which severs the bunch length pushed out onto the gates by co-action with its ledger plate 78. As this plunger continues to move downwardly a cam plate 79 having a curved lower edge engages the upper side of the gates 72 and 73 and forces them open. The plunger 76 then displaces the bunch length vertically out of line with the tobacco stream and into the loop 80 of the rolling apron 81. A rolling pin 82 operates the apron in a manner well known in this art to roll a binder placed upon the apron 81 about the bunch length filler charge to form a bunch. This rolling pin 82 is suitably guided on tracks 83 and 84 and is reciprocated by an operating link 85 by means not shown, because well known in the art.

The presser foot 71, belts 43 and 44, plunger 76 and rolling pin 82 are operated in proper timed relation by means not shown, which are fully disclosed in the application of Clausen above identified, to which reference is made for further details.

It will be understood that the channel formed by the belts 43 and 44 is of a cross section such that the tobacco left therein by the leveling and separating edge of the hopper wall 12 will be just sufficient to provide a bunch of the proper diameter when rolled. That is there will be the same amount of tobacco in a cross-sectional direction in the channel as is desired through a cross-section of the filler of the finished bunch.

It will be noted that the present construction provides a bunch forming mechanism which is both automatic as to filler feeding and has a very simple cross feed, in which there is minimum cutting of tobacco there being no cutting of the filler charge lengthwise of the charge, a common cause of flat bunches. Owing to the direct cutting and transferring of the tobacco from the forward end of the tobacco stream a minimum number of parts as well as the minimum handling of tobacco, is required.

The slot 42*a* like the channel is elongated and relatively narrow, substantially bunch width, that is wide enough to receive the tobacco to form the width of one bunch. As the tobacco pieces are stirred around by the agitators 61, elongated tobacco pieces which are lengthwise of the slot will tend to fall through the slot, whereas ones crosswise of the slot will tend to pass by the slot or be deflected into position lengthwise of the slot so that the tendency of this feed is to lay the tobacco pieces lengthwise of the slot and channel, it being difficult for a leaf arranged crosswise to enter and stay in the channel unless turned or shaken to lengthwise position. The short, direct and controlled displacement of the bunch length severed at the forward end of the channel, into the rolling apron retains this lengthwise arrangement of scrap. This lengthwise arrangement of scrap is highly desirable in forming scrap bunches since it improves the drawing qualities and uniformity of the bunch and makes it possible to use larger scrap and to gain a closer approximation to long filler results in which pieces are laid by hand lengthwise of each other.

What is claimed is:

1. The combination with a plurality of traveling belts arranged to form a filler feeding channel, of a tobacco hopper rotating about a vertical axis and having a stationary bottom provided with a slot overlying said channel, whereby a continuous stream of tobacco is placed in said channel, the bottom edge of said hopper being serrated and arranged to pass over said channel to level the stream of tobacco and prevent choking.

2. The combination with a plurality of traveling belts arranged to form a filler feeding channel, of a tobacco hopper rotating about a vertical axis and having a stationary bottom provided with a slot overlying said channel, whereby a continuous stream of tobacco is placed in said channel, the bottom edge of said hopper being serrated and arranged to pass over said channel to level the stream of tobacco and prevent choking, and means for driving said belts and hopper in synchronism.

3. The combination with a plurality of traveling belts arranged to form a filler feeding channel, of a tobacco hopper rotating about a vertical axis and having a stationary bottom provided with a slot overlying said channel, whereby a continuous stream of tobacco is placed in said channel, the bottom of said hopper including a stationary plate in which said slot is formed, and a stationary cone above said plate.

4. The combination with a plurality of traveling belts arranged to form a filler feeding channel, of a tobacco hopper rotating about a vertical axis and having a stationary bottom provided with a slot overlying said channel, whereby a continuous stream of tobacco is placed in said channel, the bottom of said hopper including a stationary plate in which said slot is formed and a stationary cone above said plate, and means for driving said belts and hopper in synchronism.

5. The combination with a hopper for holding a supply of tobacco and having an outlet, of mechanism forming a channel adjacent said outlet for receiving tobacco from the hopper and forwarding it in a continuous stream, and means at said outlet for holding back and separating the tobacco at said outlet above said channel from that in the channel, said means including a wall having its lower edge adjacent the upper side of said channel traveling across said channel, said edge being roughened.

6. In a cigar bunch machine, the combination with a tobacco hopper rotating about a vertical axis and having a stationary bottom provided with an outlet, of means for feeding tobacco from said outlet in a continuous stream, including rotary agitators in said hopper, means for driving said agitators relative to said hopper past said outlet, said agitators being arranged close to the outer wall of said hopper whereby the wall tends to clear the agitators and prevent wrapping of scraps around the same.

7. In a cigar bunch machine, the combination with a tobacco hopper rotating about a vertical axis and having stationary bottom provided with an outlet, of means for feeding a tobacco from said outlet in a stream, including rotary agitators in said hopper, means for driving said agitators at a speed greater than that of said hopper, and a cone above the bottom of said hopper coacting with said agitators to direct tobacco to said outlet.

8. A tobacco feed comprising a generally cylindrical hopper, rotatable about a vertical axis, and having a stationary bottom, means rotating said hopper, an outlet for tobacco at the bottom of said hopper, agitators in the hopper, and means for revolving said agitators on said vertical axis relative to said hopper to feed tobacco from said outlet.

9. A tobacco feed comprising a generally cylindrical hopper, rotatable about a vertical axis, and having a stationary bottom, means rotating said hopper, an outlet for tobacco at the bottom of said hopper, agitators in the hopper, and means for revolving said agitators on said vertical axis relative to said hopper to feed tobacco from said outlet, said agitators being positioned with their lengths extending vertically along said cylindrical hopper in substantially scraping relation therewith.

10. The combination with a plurality of traveling belts arranged to form a filler feeding channel, of a tobacco hopper for scrap cigar filler tobacco, rotating about a vertical axis and having a stationary bottom provided with portions spaced from each other to provide a narrow slot overlying and extending lengthwise of said channel, said hopper being arranged to operate on scrap cigar filler tobacco, a substantial portion of the pieces of which are of such size that the slot will tend to arrange any pieces passing through said slot so that the long axis of the pieces passed will extend lengthwise of said slot and channel, whereby a continuous stream of tobacco is placed in said channel.

11. The combination with a plurality of traveling belts arranged to form a filler feeding channel, of a tobacco hopper for scrap cigar filler tobacco rotating about a vertical axis, and having a stationary bottom provided with separate portions spaced from each other to provide a narrow slot overlying and extending lengthwise of said channel, said hopper being designed to operate on scrap cigar filler tobacco, a substantial portion of the pieces of which are of such size that the slot will tend to arrange the pieces so that the long axis of the pieces passed will extend lengthwise of said slot and channel, whereby a continuous stream of tobacco is placed in said channel, and means for intermittently driving said belts and hopper in synchronism.

12. The combination with a plurality of belts arranged to form a filler feeding channel, of a tobacco hopper for scrap cigar filler tobacco, rotating about a vertical axis and having a stationary bottom provided with portions spaced from each other to provide a narrow slot overlying and extending lengthwise of said channel, said hopper being arranged to operate on scrap cigar filler tobacco, a substantial portion of the pieces of which are of such size that the slot will tend to arrange any pieces passing through said slot so that the long axis of the pieces passed will extend lengthwise of said slot and channel, whereby a continuous stream of tobacco is placed in said channel, rotary agitators in said hopper, and means for intermittently driving said belts, hopper and agitators in synchronism.

13. In a cigar bunch machine, the combination with a vertical intermittently rotating hopper for holding a supply of filler tobacco, of means for feeding tobacco from said hopper in a continuous approximately bunch width stream, a cutter for separating approximately a bunch length from the forward portion of said stream, means for displacing the bunch length sidewise relative to the length of said stream, out of line with said stream, and a rolling apron for rolling said separated and displaced bunch length to form a cigar bunch, said feeding means including devices acting on the pieces of filler tobacco to arrange the tobacco in said stream with elongated pieces extending in a generally lengthwise direction relative to the length of said stream whereby the pieces will be arranged lengthwise in the completed bunch, said devices including a wall having spaced portions forming an elongated slot through which the pieces must pass to enter said stream, said slot being less in width than the length of a substantial portion of the elongated pieces of filler tobacco so that pieces passed through the slot will tend to extend lengthwise of the slot.

14. The combination with a hopper for holding a supply of tobacco and having portions spaced from each other to provide a narrow elongated outlet less in width than the length of a substantial portion of the elongated tobacco pieces of said supply so that the pieces passing through said outlet will tend to extend with their longitudinal axes lengthwise of said outlet, of mechanism forming a channel adjacent said outlet for receiving tobacco from the hopper and forwarding it in a continuous stream, and means at said outlet for holding back and separating the tobacco at said outlet above said channel from that in the channel, said means including a wall having its lower edge adjacent the upper side of said channel traveling across said channel.

15. The combination with a hopper for holding a supply of tobacco and having portions spaced from each other to provide a narrow elongated outlet less in width than the length of a substantial portion of the elongated tobacco pieces of said supply so that the pieces passing through said outlet will tend to extend with their longitudinal axes lengthwise of said outlet, of mechanism forming a channel adjacent said outlet for receiving tobacco from the hopper and forwarding it in a continuous stream, and means at said outlet for holding back and separating the tobacco at said outlet above said channel from that in the channel, said means including a cylindrical wall rotating about a vertical axis with its lower edge adjacent the upper side of said channel.

16. The combination with a vertical, intermittently rotating hopper for holding a supply of tobacco, of mechanism forming a channel having moving bottom and side walls and an open top side extending along and adjacent a narrow slot for receiving tobacco from the hopper and forwarding it in a continuous stream, said hopper having portions spaced from each other to provide said narrow slot overlying and extending lengthwise of said channel, said hopper being designed to operate on filler tobacco pieces, a substantial portion of which are of such size that the slot will tend to arrange the pieces so that the long axis of the pieces passed will extend lengthwise of said slot and channel, and means for holding back and separating the tobacco above said channel from that in the channel.

17. In a cigar bunch machine, the combination with driven side and bottom belts arranged to form a relatively narrow tobacco forwarding channel, of a hopper for holding a supply of filler tobacco having a relatively narrow elongated slot overlying said channel with its length extending lengthwise of the channel, said slot being sufficiently narrow to prevent passage of elongated filler pieces arranged crosswise of the slot, means for feeding tobacco from said hopper into said channel to form therein a substantially continuous stream, of a cross-section sufficient when rolled to form a bunch of predetermined diameter, a cutter for separating approximately a bunch length from the forward portion of said stream, means for displacing the bunch length sidewise relative to the length of said stream, out of line with said stream, and a rolling apron for rolling said separated and displaced bunch length to form a cigar bunch.

HJALMAR E. CARLSON.